Oct. 23, 1962    H. R. PFLUMM    3,059,331
METHOD OF MAKING COMPOSITE STOCK
Filed March 10, 1958
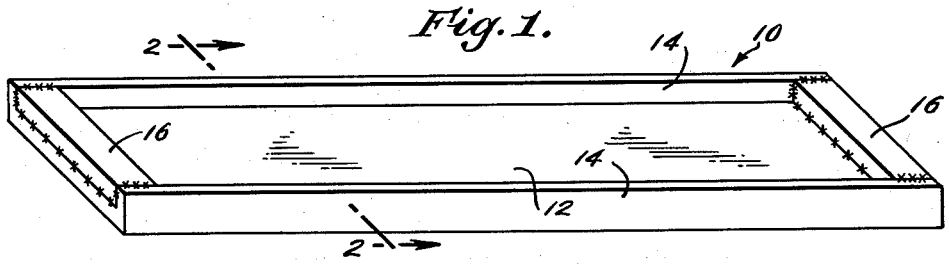
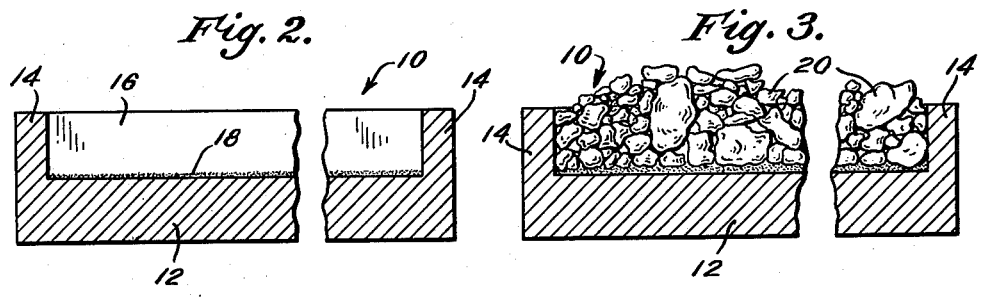
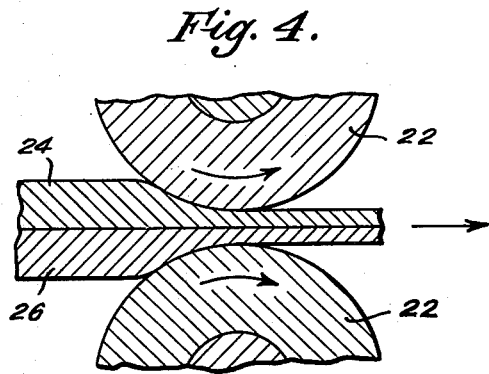
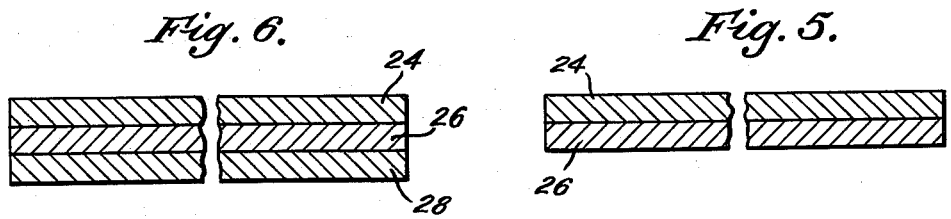
Inventor,
Heinz R. Pflumm,
by William W. Vollow Jr.
Att'y.

3,059,331
Patented Oct. 23, 1962

3,059,331
METHOD OF MAKING COMPOSITE STOCK
Heinz R. Pflumm, Plainville, Mass., assignor to Texas Instruments Incorporated, Dallas, Tex., a corporation of Delaware
Filed Mar. 10, 1958, Ser. No. 720,473
25 Claims. (Cl. 29—528)

This invention relates to a method of making composite stock useful in solid-electrolyte batteries.

According to one form of solid-electrolyte battery, a layer of silver is adhered to a layer of one of silver bromide, silver chloride or silver iodide. The silver layer acts as the anode of the battery and the silver halide layer as the electrolyte thereof.

The surface of the silver layer opposite that to which the silver halide layer is adhered can be bonded to a base layer of corrosion-resistant metal such as stainless steel preferably of the austenitic type, Monel and Inconel. Monel is a line of high nickel-copper alloys and Inconel is a high nickel-chromium-iron alloy; both of these being registered trademarks of the International Nickel Company, Inc., of New York, New York.

In making such composite stock, a number of difficulties are encountered. First, the adhesion between the layers should be sufficiently strong to withstand substantial working (such as rolling, cutting and stamping out pieces) without separation of the layers. Both of the layers should be sufficiently ductile to withstand such working without flaking, cracking or otherwise becoming damaged. In addition, it is desirable that the adhered layers of which the components are formed be substantially uniform in thickness and be capable of being substantially reduced by rolling so that the process be commercially feasible. This latter desideratum comprehends the provision of a method whereby the initial thickness of the respective layers be sufficiently large to yield the respective thickness required at final gauge after rolling. Also, any modification of the silver layer should not have the effect or preventing the formation of an adequate bond between the silver layer and the corrosion-resistant, metal, base layer. Applicant's new and improved method overcomes all of the above-mentioned difficulties, provides the above-noted desirable features and, in addition, results in other advantages which will become apparent as the description proceeds.

An object of this invention is to provide a new and improved method of making composite stock useful in solid-electrolyte batteries.

A further object of this invention is to provide such a method whereby the adherence between the silver halide and anode-forming layers is strong and the ductility of these layers is high.

A further object of this invention is to provide such a method which involves or permits substantial reduction by rolling of the composite stock.

A further object is to provide such a method which is inexpensive, dependable and well-suited to production in large quantities.

Other objects will be in part obvious and in part pointed out hereinafter.

The invention accordingly comprises the steps and sequence of steps and features of operation which will be exemplified in the methods hereinafter described, and the scope of the application of which will be indicated in the following claims.

In the accompanying drawings, in which several of various possible embodiments of the invention are illustrated:

FIG. 1 is a perspective view of a receptacle, at least the bottom of which is made up of the anode-forming material of the composite stock produced by the method of this invention;

FIG. 2 is a sectional view taken along line 2—2 in FIG. 1 and showing a layer of powder (indicated by stippling) which covers the bottom of the receptacle, this powder being in the form of one of the silver halides according to the invention;

FIG. 3 is a view similar to FIG. 2 but showing the receptacle with an additional quantity of the respective silver halide disposed on the powder layer;

FIG. 4 is a fragmentary, more or less diagrammatic view indicating the manner in which the composite stock according to the invention is reduced by rolling;

FIG. 5 is a sectional view of a piece of composite stock produced by the method of this invention; and FIG. 6 is a view similar to FIG. 5 but showing the composite stock of this latter figure with an additional base layer bonded thereto.

The improved method of this invention involves melting one of silver bromide, silver chloride and silver iodide in contact with a layer of fine or substantially pure silver. Ordinarily, it is difficult to obtain satisfactory adherence of a practicable thickness of silver halide to the anode-forming layer along the entire surface of the latter by melting the former in contact with the latter. However, applicant has discovered that a satisfactory adherence of a sufficiently thick layer of the silver halide along the entire surface of the anode-forming layer can be obtained by this melting technique if the cooling step is effected in the direction from the anode-forming layer toward the silver halide or, stated otherwise, by setting up a negative temperature gradient from the exposed surface of the silver halide to the outer surface of the anode-forming layer. By so cooling the assembly, shrinkage cracking between the layers is avoided and uniformly good adherence is obtained. Upon cooling the assembly, it is found that the silver halide layer is porous, and this cannot be abided from an operational standpoint in a solid-phase battery. According to another feature of this invention, however, this porosity is eliminated by rolling whereby the material is compacted, and, concomitantly, the adhered layers are reduced in thickness whereby the lateral dimensions of the layers are increased.

As the anode-forming layer adhered to the layer of any one of silver bromide, silver chloride and silver iodide is rolled to reduce the thickness of the respective layers, the anode-forming layer, of course, work-hardens. In order that sufficient reduction by rolling can be effected, it is often necessary that the anode-forming layer be internally stress-relieved by one or more intermediate annealing steps. Also, it has been found that the quality or degree of adherence between the respective layers decreases with reduction by rolling and that heating of the composite stock tends to result in porosity of the silver halide layer. The amount of heating necessary to internally stress-relieve the anode-forming layer is a function, of course, of the length of time of heating and the temperature to which the layer is heated. In some cases, it may be desirable to anneal sufficiently to recrystallize the anode-forming layer. Further to complicate the problem, the degree of ductility possessed by the silver halide layer appears to decrease with rolling. According to another important feature of this invention, applicant has discovered that a particular temperature range exists for each embodiment of composite stock according to this invention, and upon heating to a temperature within the respective range, no increase in the porosity of the silver halide layer results and good adherence between the anode-forming layer and the silver halide layers results. Within this temperature range, in all cases, the resulting ductility of the silver halide layer is good.

It is to be noted that the method of this invention contemplates providing the material of the anode-forming layer as silver having insufficient agents and impurities present to affect deleteriously the process or the resulting product. For example, commercially fine silver otherwise known as "three nines" fine silver is well suited to the process. It is also to be noted that each of the silver halides under this invention can be modified by the inclusion of agents or impurities which do not deleteriously affect the process or resulting product. For example, the addition of approximately 5% by weight of tellurium to silver bromide substantially improves the electrical characteristics of this silver halide in the environment of a solid-phase battery without affecting the subject method. This addition of tellurium does not constitute a part of the instant invention and has been cited merely by way of example.

A description in detail of the steps followed by which the instant invention can be carried out will now be set forth. It is to be realized that, although the following detailed example is with respect to silver bromide as the silver halide to be selected from the group consisting of silver bromide, silver chloride and silver iodide, the manipulative steps will be the same for silver chloride and silver iodide; the only variance lying in the particular temperatures involved. Referring to the drawing, a receptacle or "boat" generally indicated by the reference numeral 10 is provided, the bottom of which is formed by a flat layer 12 of the anode-forming material. In the form shown in FIG. 1, for example, the receptacle 10 is provided by milling out a one inch thick slab of commercially fine silver to a depth of approximately one-half inch, leaving upstanding side walls 14, 14. The end walls of the receptacle are formed by bars 16, 16 welded along the edges of the bar wherein contact with the milled-out portion of the slab thereby to render the receptacle fluid-tight. By way of example, the receptacle 10 may be in the order of 20 inches in length and 5 inches in width.

Referring to FIG. 2, the silver bottom of the receptacle is next covered with a thin layer 18 (indicated by stippling) of powdered silver bromide of, for example, 200 mesh size. The receptacle is then filled to the desired height with additional silver bromide in any desired form such as coarse grains as indicated at 20 in FIG. 3. The assembly is then placed in a furnace or over an open flame and heated to a sufficient temperature to melt the silver bromide. A substantial advantage results from first applying the thin layer 18 of powdered silver bromide in that it melts rapidly and provides good contact between the bottom 12 of the receptacle and the remainder of the silver bromide 20, thereby speeding up the length of time required to render all the silver bromide molten. Silver bromide, as well as silver chloride and silver iodide, possesses a high degree of fluidity when molten, and upstanding side walls 14, 14 and end walls 16, 16 effectively confine the silver bromide against running off the bottom 12.

The assembly is then cooled in the direction from the silver layer to the molten silver bromide to solidify the molten silver bromide, this being accomplished by placing the receptacle 10 upright on a support formed of high heat conductivity material such as copper. Alternatively, or additionally, a negative temperature gradient from the molten silver bromide to the silver layer can be effected during cooling by applying heat to the surface of the silver bromide as by gas flame.

Upon cooling from the temperature at which the silver bromide is melted, the silver bromide layer may be of substantially the same thickness as the anode-forming layer and will be porous, this porosity being eliminated during the subsequent rolling along with reduction in the thickness of the adhered layers. As noted above, however, rolling tends to lower the ductility of the silver bromide layer (as well as that of the silver layer) and tends to lower the degree of adherence between the respective layers. It has been found that if the layers are heated to a temperature within the range of from 525° F. to 575° F., the silver bromide layer is rendered ductile and the adherence between the layers becomes very good. If the layers are heated to a temperature above 575° F., the silver bromide layer becomes porous. This porosity is believed to be due, at least in part, to hydrolysis. If the layers are heated to a temperature below 525° F., the porosity of the silver bromide layer is unaffected, but the ductility of this layer is unsatisfactorily low and the adherence between the respective layers is very weak. Accordingly, if the final reduction by rolling is carried out at a temperature below 575° F. and is sufficient to eliminate porosity from the silver bromide layer, and the finally rolled stock is heated to a temperature within the range of 525° F., the adherence between the respective layers will be very good, the ductility of the silver bromide layer will be high and the latter layer will be non-porous. By way of example, in following the method of this invention, the initial composite stock of this example was successfully rolled, with intermediate anneals, to a total reduction of over 99.5% and the resulting product exhibited the desired qualities of very good adherence between the layers, the ductility of the silver bromide was high and the latter layer was non-porous. The marginal portions of the composite stock are trimmed off to remove the material of side walls 14, 14 and end walls 16, 16 preferably when the stock has been rolled down to a thickness of approximately 0.020 to 0.025 of an inch because these walls tend to prevent squeezing out of the silver halide during rolling down to this thickness and the stock tends to wrinkle upon rolling to thinner gauges unless the side walls are trimmed off at this gauge.

When silver chloride is substituted for silver bromide in the above example, the silver chloride layer becomes porous if heated above 425° F. The resulting adhesion between the layers is good and the ductility of the silver chloride layer is of sufficiently high degree all the way from 525° F. down to room temperature. When silver iodide is substituted for the silver bromide in the above example, porosity results when the heating is carried out at a temperature above 450° F., and the ductility of the silver iodide and adherence between the layers is good from 300° F. down to room temperature.

In the remaining portion of this description, it is to be understood that each reference to "the respective temperature range" is to be taken to mean 525° F. to 575° F. for the case of composite stock wherein the electrolyte-forming layer is of silver bromide, room temperature to 425° F. for the case when this layer is formed of silver chloride, and room temperature to 300° F. for the case when this layer is formed of silver iodide.

It will be clear that if all of the reduction by rolling is carried out at a temperature within the respective temperature range, no subsequent heating is required to render the silver halide layer ductile and to effect good adherence between the respective layers. If it is desired or required that the anode-forming layer of the composite stock after final rolling be internally stress-relieved, the finally rolled composite stock is subjected to a final heating at a temperature within the respective temperature range for a sufficient length of time to effect the stress-relief; and this results in the silver halide layer having high ductility and the adherence of the layer being good whether the composite stock is finish-rolled within or below the respective temperature range.

Due to work-hardening of the silver of the anode-forming layer during rolling, it is often necessary that the total reduction be carried out with one or more intermediate annealing steps to internally stress-relieve the silver. Whereas the extent of internal stress-relief of the anode-forming layer is a function of the annealing temperature and the length of time of heating, the beneficial results of obtaining good adherence between the layers and rendering the silver halide layer ductile by heating according to the method of this invention are a function of the temperature to which the stock is heated without regard for the length of time of heating at this temperature. It will be clear that if all of the reduction by rolling and all of the annealing steps are carried out within the respective temperature range, the silver halide layer will be non-porous, the ductility of the latter layer will be good, the adherence between the respective layers will be strong, and the only heating required subsequent to final rolling would be that for internal stress-relief of the anode-forming layer. This heating subsequent to final rolling must be carried out at a temperature below the upper limit of the respective temperature range so that recurrence of porosity in the silver halide layer will be avoided. In those cases, of course, where the anode-forming layer of the final product is not required or desired to be internally stress-relieved, this annealing step subsequent to the final heating will be omitted.

It will be clear that, prior to final rolling of the composite stock, the latter can be rolled and/or annealed at a temperature above the respective temperature range. To the extent that the higher the temperature the greater is the ease of rolling, it is preferred to hot roll the stock. Difficulty is often encountered when rolling prior to final rolling at temperatures above the respective temperature range because the tendency at such temperatures is for the adherence between the respective layers to weaken; and it is therefore advantageous to hot roll within the respective temperature range. In any case, however, it is necessary that the composite stock be finish-rolled at a temperature within or below the respective temperature range in order that porosity of the silver halide layer be avoided. Also and in any case, the final rolling step must effect a reduction sufficient that any existing porosity in the silver halide layer will be eliminated. If the composite stock is finally rolled within the respective temperature range, it is not necessary subsequently to heat the stock again unless it is desired or required that the anode-forming layer be internally stress-relieved in which case this subsequent heating would be, of course, at a temperature below the upper limit of the respective temperature range to prevent the recurrence of porosity in the silver halide layer. Where the composite stock is finally rolled below the lowest temperature at which the adherence between the layers is strong and the ductility of the silver layer is good, it is necessary subsequently to heat the composite stock to a temperature above this lowest temperature but below the upper limit of the respective temperature range to render said adherence strong and to render the silver halide layer ductile (and this heating or still later heating must be maintained for a sufficient length of time to internally stress-relieve the anode-forming layer if such is desired or required in the finished product).

In those cases where the electrolyte-forming layer is of either silver chloride or silver iodide, total reduction of the composite stock can be carried out at room temperature and the only heating above room temperature necessary is that to internally stress-relieve the anode-forming layer (either to permit further reduction by rolling or where desired or required in the finished product). The same is true (in the cases of silver chloride and silver iodide) where only the final rolling of the composite stock is carried out at room temperature so long as this final rolling sufficiently reduces the composite stock to eliminate any existing porosity in the electrolyte-forming layer. All of this is true because the respective temperature range for these two silver halides extends down to room temperature.

In the case where the electrolyte-forming layer is of silver bromide, total reduction (or only final reduction if sufficient to eliminate any existing porosity in the silver bromide layer) of the composite stock can be carried out at room temperature but it is necessary, in addition, that the composite stock be heated after final rolling to a temperature within the range of from 525° F. to 575° F. (and this heating or subsequent heating must be maintained for a sufficient length of time to internally stress-relieve the anode-forming layer if such is desired or required in the finished product). Also, when the electrolyte-forming layer is of silver bromide, no heating subsequent to final rolling is required so long as total reduction (or only final reduction if sufficient to eliminate any existing porosity in the silver bromide layer) of the adhered layers is carried out while these layers are within the temperature range of from 525° F. to 575° F. unless, of course, subsequent internal stress-relief of the anode-forming layer is desired or required.

The base layer 28 of corrosion-resistant metal as shown in FIG. 6 can ordinarily be solid-phase bonded to the anode-forming layer 26 at any convenient stage in the method according to this invention. This solid-phase bonding is accomplished in the manner fully described in U.S. Patent No. 2,691,815.

The quality of the adherence between the anode-forming layer and the electrolyte-forming layer, and the ductility of the silver halide layer of the product of the method as claimed herein is evidenced by back and forth bending and creasing of the material when at a gauge of, for example, several thousandths of an inch thick. As a result of this bending and creasing, there is no flaking or other damage to the silver halide layer, the latter layer and the anode-forming layer otherwise remain intact, and these layers remain uniformly adhered to each other.

In practicing the method of this invention it is ordinarily preferred that the rolling be carried out at comparatively slow speeds and that, particularly at thinner gauges of from approximately 0.025 thousandths of an inch thick and lower, the rolling be carried out with as high back and front tension on the material as can be applied without tearing the silver or silver base alloy.

It is to be understood that the porosity referred to in the above description and in the appended claims is macroscopic and not porosity of, for example, molecular magnitude. Macroscopic porosity in the silver halide layer deleteriously affects open circuit current losses in solid-phase batteries, and this ill effect is avoided with the rolled composite stock according to the method of this invention.

As many changes could be made in the above methods without departing from the scope of the invention, it is intended that all matter contained in the above description or shown in the accompanying drawings, shall be interpreted as illustrative and not in a limiting sense.

In view of the above, it will be seen that the several objects of the invention are achieved and other advantageous results attained.

I claim:

1. The method of making composite stock comprising a layer of silver adhered to a layer of a ductile, non-porous silver halide selected from the group consisting of silver bromide, silver chloride and silver iodide; said method comprising the steps of melting a quantity of said silver halide in contact with a layer of silver; maintaining said melted silver halide on said layer of silver and cooling the assembly in the direction from the silver layer to the silver halide to solidify the latter whereby the layer of silver is adhered to a layer of said silver halide; and then rolling the assembly sufficiently to eliminate porosity from the silver halide layer and within a temperature range at which the silver halide layer remains free of porosity and at which good adherence between the silver and the silver halide layers results.

2. The method as set forth in claim 1 including the step of annealing said silver layer, after said rolling, at a temperature below that at which porosity of the silver halide layer occurs and for a sufficient length of time to internally stress-relieve the silver layer.

3. The method of making composite stock comprising a layer of silver adhered to a layer of a ductile, nonporous silver halide selected from the group consisting of silver bromide, silver chloride and silver iodide; said method comprising the steps of melting a quantity of said silver halide in contact with a layer of silver; cooling the assembly in the direction from the silver layer to the silver halide to solidify the latter whereby the layer of silver is adhered to a layer of said silver halide; and rolling the assembly with a plurality of rolling passes to reduce the thickness thereof, the final rolling pass being sufficient to eliminate any existing porosity from the silver halide layer and being carried out at a temperature within a range at which the silver halide layer remains free of porosity and at which good adherence between the silver and the silver halide layers results.

4. The method as set forth in claim 3 including the step of annealing said silver layer, after said rolling, at a temperature below that at which porosity of the silver halide layer occurs and for a sufficient length of time to internally stress-relieve the silver layer.

5. The method of making composite stock comprising a layer of silver adhered to a layer of a ductile, nonporous silver halide selected from the group consisting of silver bromide, silver chloride and silver iodide; said method comprising the steps of melting a quantity of said silver halide in contact with a layer of silver; cooling the assembly in the direction from the silver layer to the silver halide to solidify the latter whereby the layer of silver is adhered to a layer of said silver halide; rolling the assembly to reduce the thickness thereof and to eliminate porosity from the halide layer; and subsequently heating said adhered layers to a temperature within a range at which the silver halide layer remains free of porosity and at which good adherence between the silver and the silver halide layers results.

6. The method as set forth in claim 5 wherein said heating is maintained for a sufficient length of time to internally stress-relieve the silver layer.

7. The method of making composite stock comprising a layer of silver adhered to a layer of a ductile, nonporous silver halide selected from the group consisting of silver bromide, silver chloride and silver iodide; said method comprising the steps of melting a quantity of said silver halide in contact with a layer of silver; cooling the assembly in the direction from the silver layer to the silver halide to solidify the latter whereby the layer of silver is adhered to a layer of said silver halide; rolling the assembly with a plurality of rolling passes to reduce the thickness thereof, the final rolling pass being sufficient to eliminate any existing porosity from the silver halide layer; and subsequently heating the adhered layers to a temperature within a range at which the silver halide layer remains free of porosity and at which good adherence between the silver and the silver halide layers results.

8. The method as set forth in claim 7 wherein said heating after rolling is maintained for a sufficient length of time to internally stress-relieve the silver layer.

9. The method of making composite stock comprising a layer of silver adhered to a layer of silver bromide; said method comprising the steps of melting a quantity of silver bromide in contact with a layer of silver; cooling the assembly in the direction from the silver layer to the silver bromide to solidify the latter whereby the layer of silver is adhered to a layer of said silver bromide; and rolling the adhered layers to reduce the thickness thereof and to eliminate porosity from the silver bromide layer, said rolling being carried out within the temperature range of from 525° F. to 575° F.

10. The method of making composite stock comprising a layer of silver adhered to a layer of silver bromide; said method comprising the steps of melting a quantity of silver bromide in contact with a layer of silver; cooling the assembly in the direction from the silver layer to the silver bromide to solidify the latter whereby the layer of silver is adhered to a layer of said silver bromide; and rolling the adhered layers with a plurality of rolling passes to reduce the thickness thereof, the final rolling pass being sufficient to eliminate any existing porosity in the silver bromide layer and being carried out within the temperature range of from 525° F. to 575° F.

11. The method of making composite stock comprising a layer of silver adhered to a layer of silver bromide; said method comprising the steps of melting a quantity of silver bromide in contact with a layer of silver; cooling the assembly in the direction from the silver layer to the silver bromide to solidify the latter whereby the layer of silver is adhered to a layer of said silver bromide; rolling the adhered layers to reduce the thickness thereof and to eliminate porosity from the silver bromide layer; and subsequently heating the adhered layers to a temperature within the range of from 525° F. to 575° F.

12. The method of making composite stock comprising a layer of silver adhered to a layer of silver bromide; said method comprising the steps of melting a quantity of silver bromide in contact with a layer of silver; cooling the assembly in the direction from the silver layer to the silver bromide to solidify the latter whereby the layer of silver is adhered to a layer of said silver bromide; rolling the adhered layers with a plurality of rolling passes to reduce the thickness thereof, the final rolling pass being sufficient to eliminate any existing porosity from the silver layer; and subsequently heating the adhered layers to a temperature within the range of from 525° F. to 575° F.

13. The method of making composite stock comprising a layer of silver adhered to a layer of silver chloride; said method comprising the steps of melting a quantity of silver chloride in contact with a layer of silver; cooling the assembly in the direction from the silver layer to the silver chloride to solidify the latter whereby the layer of silver is adhered to a layer of said silver chloride; and rolling the adhered layers to reduce the thickness thereof and to eliminate porosity from the silver chloride layer, said rolling being carried out within the temperature range of from room temperature to 425° F.

14. The method of making composite stock comprising a layer of silver adhered to a layer of silver iodide; said method comprising the steps of melting a quantity of silver iodide in contact with a layer of silver; cooling the assembly in the direction from the silver layer to the silver iodide to solidify the latter whereby the layer of silver is adhered to a layer of said silver iodide; and rolling the adhered layers to reduce the thickness thereof and to eliminate porosity from the silver iodide layer, said rolling being carried out within the temperature range of from room temperature to 300° F.

15. The method of making composite stock comprising a layer of silver adhered to a layer of silver chloride; said method comprising the steps of melting a quantity of silver chloride in contact with a layer of silver; cooling the assembly in the direction from the silver layer to the silver chloride to solidify the latter whereby the layer of silver is adhered to a layer of said silver chloride; rolling the adhered layers with a plurality of rolling passes to reduce the thickness thereof, the final rolling pass being sufficient to eliminate any existing porosity in the silver chloride layer and being carried out within the temperature range of from room temperature to 425° F.

16. The method of making composite stock comprising a layer of silver adhered to a layer of silver iodide; said method comprising the steps of melting a quantity of silver iodide in contact with a layer of silver; cooling the assembly in the direction from the silver layer to the silver iodide to solidify the latter whereby the layer of silver is adhered to a layer of said silver iodide; rolling the adhered layers with a plurality of rolling passes to reduce the thickness thereof, the final rolling pass being sufficient to eliminate any existing porosity in the silver iodide layer and being carried out within the temperature range of from room temperature to 300° F.

17. The method of making composite stock comprising the steps of providing a layer of silver adhered to a layer of silver bromide; and rolling said adhered layers to reduce the thickness thereof and to eliminate porosity from the silver bromide layer, said rolling being carried out within the temperature range of from 525° F. to 575° F.

18. The method of making composite stock comprising the steps of providing a layer of silver adhered to a layer of silver bromide; and rolling said adhered layers with a plurality of rolling passes to reduce the thickness thereof, the final rolling pass being sufficient to eliminate porosity from the silver bromide layer and being carried out within the temperature range of from 525° F. to 575° F.

19. The method of making composite stock comprising the steps of providing a layer of silver adhered to a layer of silver bromide; rolling said adhered layers to reduce the thickness thereof and to eliminate porosity from the silver bromide layer; and subsequently heating the adhered layers to a temperature within the range of from 525° F. to 575° F.

20. The method of making composite stock comprising the steps of providing a layer of silver adhered to a layer of silver bromide; rolling said adhered layers with a plurality of rolling passes to reduce the thickness thereof, the final rolling pass being sufficient to eliminate any existing porosity from the silver bromide layer; and subsequently heating the adhered layers to a temperature within the range of from 525° F. to 575° F.

21. The method of making composite stock comprising the steps of providing a layer of silver adhered to a layer of silver chloride; and rolling said adhered layers to reduce the thickness thereof and to eliminate porosity from the silver chloride layer, said rolling being carried out within the temperature range of from room temperature to 425° F.

22. The method of making composite stock comprising the steps of providing a layer of silver adhered to a layer of silver chloride; and rolling said adhered layers with a plurality of rolling passes to reduce the thickness thereof, the final rolling pass being sufficient to eliminate any existing porosity from the silver chloride layer and being carried out within the temperature range of from room temperature to 425° F.

23. The method of making composite stock comprising the steps of providing a layer of silver adhered to a layer of silver iodide; and rolling said adhered layers to reduce the thickness thereof and to eliminate porosity from the silver iodide layer, said rolling being carried out within the temperature range of from room temperature to 300° F.

24. The method of making composite stock comprising the steps of providing a layer of silver adhered to a layer of silver iodide; and rolling said adhered layers with a plurality of rolling passes to reduce the thickness thereof, the final rolling pass being sufficient to eliminate any existing porosity from the silver iodide layer and being carried out within the temperature range of from room temperature to 300° F.

25. The method of making composite stock comprising a layer of silver adhered to a layer of a ductile non-porous silver halide layer selected from the group consisting of silver bromide, silver chloride and silver iodide; said method comprising the steps of disposing a thin layer of powdered silver halide material against said layer of silver; subsequently applying a layer of silver halide material in coarse particulate form against said thin powdered layer; melting both of said halide layers; cooling the assembly in the direction from the silver layer to the silver halide to solidify the latter whereby the layer of silver is adhered to a layer of said silver halide; and then rolling the assembly sufficiently to eliminate porosity from the silver halide layer and within a temperature range at which the silver halide layer remains free of porosity and at which good adherence between the silver and the silver halide layers results.

References Cited in the file of this patent

UNITED STATES PATENTS

| | | |
|---|---|---|
| Re. 24,408 | Hack et al. | Dec. 17, 1957 |
| 132,338 | Warden | Oct. 15, 1872 |
| 1,751,489 | Miller | Mar. 25, 1930 |
| 2,198,254 | Koehring | Apr. 23, 1940 |
| 2,267,342 | Schwartz et al. | Dec. 23, 1941 |
| 2,662,270 | Mitchell et al. | Dec. 15, 1953 |
| 2,689,876 | Lehovec | Sept. 21, 1954 |
| 2,894,053 | Louzos | July 7, 1959 |
| 2,902,748 | Schaefer | Sept. 8, 1959 |